US005784533A

United States Patent [19]
Van de Kerkhof et al.

[11] Patent Number: 5,784,533
[45] Date of Patent: Jul. 21, 1998

[54] ARRANGEMENT FOR DETERMINING A SIGNAL SPECTRUM OF A WIDEBAND DIGITAL SIGNAL AND FOR DERIVING BIT ALLOCATION INFORMATION IN RESPONSE THERETO

[75] Inventors: Leon M. Van de Kerkhof; Pope Ijtsma, both of Eindhoven, Netherlands

[73] Assignee: U.S. Philips Corporation, New York, N.Y.

[21] Appl. No.: 442,847

[22] Filed: May 17, 1995

[30] Foreign Application Priority Data

May 19, 1994 [EP] European Pat. Off. .............. 94201427

[51] Int. Cl.$^6$ ................. G10L 9/18; G10L 7/00
[52] U.S. Cl. ......................... 395/2.38; 395/2.39
[58] Field of Search .............. 395/2, 2.14–2.19, 395/2.38, 2.39; 381/29–40

[56] References Cited

U.S. PATENT DOCUMENTS

| | | | |
|---|---|---|---|
| 4,896,362 | 1/1990 | Veldhuis et al. | 381/30 |
| 5,222,189 | 6/1993 | Fielder | 395/2 |
| 5,260,980 | 11/1993 | Akagiri et al. | 375/122 |
| 5,323,396 | 6/1994 | Lokhoff | 370/94.1 |
| 5,365,553 | 11/1994 | Veldhuis et al. | 375/122 |
| 5,367,608 | 11/1994 | Veldhuis et al. | 395/2.38 |
| 5,583,962 | 12/1996 | Davis et al. | 395/238 |

FOREIGN PATENT DOCUMENTS

| | | | |
|---|---|---|---|
| 289080A1 | 4/1988 | European Pat. Off. | H04B 1/66 |
| 400755A1 | 5/1990 | European Pat. Off. | H04B 1/66 |
| 457390A1 | 5/1991 | European Pat. Off. | H04B 1/66 |
| 457391A1 | 5/1991 | European Pat. Off. | H04B 1/66 |

OTHER PUBLICATIONS

Michael A. Krasner, The Critical Band Coder—Digital Encoding of Speech Signals Based on the Perceptual Requirements of the Auditory System, pp. 327–331, 1980 IEEE.

K. Brandenburg et al., The ISO/MPEG-audio codec: a generic standard for coding of high-quality digital audio preprint No. 3336 of the 92nd AES Convention in Vienna, Mar. 1992.

*Primary Examiner*—Douglas W. Olms
*Assistant Examiner*—Ajit Patel
*Attorney, Agent, or Firm*—Michael E. Belk

[57] ABSTRACT

An arrangement for determining a signal spectrum of a wideband digital audio signal in an adaptive bitallocation system, including a signal splitting unit for splitting the wideband digital audio signal into M narrow band sub signals ($SB_m$), each one of the M sub signals being representative of a component of the wideband digital audio signal which is present in a corresponding one of M adjacent substantially non-overlapping narrow bands in the frequency band of the wideband digital audio signal; and a, calculating unit for each time determining from the M sub signal, information which is representative of the signal spectrum of the wideband digital audio signal, wherein M is an integer larger than one. The calculating unit includes a transformation unit for carrying out on each of the sub signals a time-to-frequency transform based signal processing so as to obtain the information representative of the signal spectrum of the wideband digital audio signal. The time-to-frequency transform based processing can be a Fourier transform.

12 Claims, 4 Drawing Sheets

ARRANGEMENT FOR DETERMINING A SIGNAL SPECTRUM OF A WIDEBAND DIGITAL SIGNAL AND FOR DERIVING BIT ALLOCATION INFORMATION IN RESPONSE THERETO

BACKGROUND OF THE INVENTION

The invention relates to an arrangement for determining a signal spectrum of a wideband digital audio signal and for deriving bit allocation information in response thereto, in an adaptive bitallocation system, the arrangement comprising an input terminal for receiving the wideband digital audio signal, signal splitting means for splitting the wideband digital audio signal into M narrow band sub signals, each one of the M sub signals being representative of a component of the wideband digital audio signal which is present in a corresponding one of M adjacent substantially non-overlapping narrow bands in the frequency band of the wideband digital audio signal, calculating means for each time determining from the M sub signals, information which is representative of the signal spectrum of the wideband digital audio signal, bit allocation information determining means for deriving bit allocation information in response to the information which is representative of the signal spectrum of the wide band digital audio signal, the bit allocation information being representative of the number of bits with which samples of the sub signals will be represented, and where M is an integer larger than one. Such an arrangement is known from EP-A 457,390 and EP-A 457,391, the documents (D1) and (D2) respectively, in the list of references given below. More specifically, the powers in each of the subbands are calculated by squaring the sample values present in time equivalent signal blocks of the subband signals and summing the squared sample values in a time equivalent signal block. The signal blocks in the documents listed above are 12 samples long.

The powers thus obtained are processed in a matrix multiplication step so as to obtain masked power values. Those masked power values result in bitneeds $b_1$ to $b_M$ for the samples in the time equivalent signal blocks of the M subband signals. In a bitallocation step, those bitneed values are used so as to allocate bits to the samples, resulting in the bitallocation information values $n_1$ to $n_M$. $n_m$ indicating the number of samples with which the 12 samples in the signal block of subband m will be represented, after having carried out a quantization on the samples in the subbands.

Another known way to obtain information representative of the signal spectrum of the wideband digital audio signal, is to carry out a time-to-frequency transform based signal processing, more specifically a Fourier transform, on the wideband digital audio signal. This is described in preprint no. 3336 of the 92nd AES Convention in Vienna, March 1992, titled 'The ISO/MPEG-audio codec: a generic standard for coding of high-quality digital audio', by K. Brandenburg et al, the document (D7) in the list of references.

SUMMARY OF THE INVENTION

The invention aims at providing an alternative way of determining the information representative of the signal spectrum of the wideband digital audio signal.

The arrangement in accordance with the invention is characterized in that the calculating means comprises transformation means for carrying out on each of the sub signals a time-to-frequency transform based signal processing so as to obtain said information representative of the signal spectrum of the wideband digital audio signal. The invention is based on the following recognition.

The signal processing described in (D1) and (D2) is open for improvement, as psycho-acoustic tests have revealed that an improvement in accuracy is desired especially for the estimation of the signal spectrum in the low frequency area of the operating frequency range of the wideband digital signal. By carrying out a time-to-frequency transform based signal processing, such as a discrete Fourier transform, on the subband signals itself, such an improvement can be obtained. This amongst others, for the reason that a larger resolution on the frequency axis can be obtained.

Further, carrying out a time-to-frequency transform, such as a discrete Fourier transform, on the wideband digital signal may result in a better estimation of the signal spectrum, compared to the processing described in (D1) and (D2). More specifically, a 512-point digital Fourier transform can be carried out on the wideband digital audio signal so as to obtain 257 frequency samples in the frequency range of interest, that is: between 0 Hz and 24 kHz, assuming that the sampling frequency is 48 kHz.

However, a large number of calculations of high precision must be carried out in order to realize the Fourier transform on the wideband digital signal. This results in the circuit realization to be expensive, as the IC's incorporating the Fourier transform processing on the wideband digital signal are complex and large, and thus expensive.

Carrying out a time-to-frequency transform based signal processing on the subband signals, in accordance with the invention, may result in simpler calculations to be carried out, as the bandwidth of the subbands, and thus the bandwidth of the subband signals is small. The time-to-frequency transform based signal processing, such as a Fourier transform based signal processing carried out, is equivalent to carrying out a p-point discrete Fourier transform on the subband signals, where p is a very low number, resulting in a low number of calculations to be carried out in the time-to-frequency transform based signal processing. As a consequence, the circuit realization of the arrangement in accordance with the invention can be much simpler, and thus cheaper.

It should be noted here that the value $q_1$ may be chosen larger than 12, the value 12 being the number (q) of values of the signal blocks on which the quantization is carried out, see the prior art documents listed above. More specifically, in the case that $q_1$ is chosen larger than 12, the last 12 values in the signal block of $q_1$ values may be the signal block of 12 samples on which the quantization will be carried out.

The arrangement in accordance with the invention, in which the calculating means being adapted to determine each time from M time equivalent signal blocks, one block in each of the M sub signals, each signal block comprising $q_1$ samples of a sub signal, said information which is representative of the signal spectrum of the wideband digital audio signal, where $q_1$ is an integer larger than one, is further characterized in that the transformation means being further adapted to carry out on each of the time equivalent signal blocks said time-to-frequency transform based signal processing so as to obtain said information representative of the signal spectrum of the wideband digital audio signal. In this embodiment, a time-to-frequency based signal processing is recurrently carried out on a signal block of $q_1$ samples in a subband signal, so as to recurrently obtain said information representative of the signal spectrum of the wideband digital audio signal. It may be clear that subsequent signal blocks of $q_1$ samples in a subband signal will overlap in the case that $q_1$ is larger than q, where q is the number of subsequent signal blocks in a subband signal on which the quantization is carried out.

The arrangement in accordance with the invention may be further characterized in that, the transformation means are adapted to carry out a time-to-frequency transform based signal processing which is equivalent to carrying out a time-to-frequency transform on each signal block so as to obtain transform coefficients for each signal block of a subband signal in a subband, deriving therefrom information representative of the signal spectrum in said subband, and combining the information representative of the signal spectra in the M subbands so as to obtain said information representative of the signal spectrum of the wideband digital audio signal. In this embodiment, a time-to-frequency transform based signal processing is carried out which is equivalent to one time-to-frequency transform being carried out on the $q_1$ samples in a signal block.

Another embodiment of the arrangement is characterized in that the transformation means are adapted to carry out a time-to-frequency transform based signal processing which is equivalent to carrying out, on each signal block, n times a time-to-frequency transform on samples of a signal block so as to obtain n sets of transform coefficients for a signal block in a subband, deriving therefrom information representative of the signal spectrum in said subband, and combining the information representative of the signal spectra in the M subbands so as to obtain said information representative of the signal spectrum of the wideband digital audio signal. In this embodiment, a time-to-frequency transform based signal processing is carried out which is equivalent to a number of n time-to-frequency transforms being carried out on a signal block. More specifically, as the number of samples used in the said transforms will be smaller than $q_1$, very simple calculations are required so as to obtain the information representative of the signal spectrum of the wideband digital audio signal.

The time-to-frequency transform carried out will preferably be a discrete Fourier transform. Other transforms will however also be possible, such as a discrete cosine transform (DCT).

BRIEF DESCRIPTION OF THE DRAWINGS

These and other aspects of the invention will be described with reference to the following drawings, in which.

DESCRIPTION OF THE PREFERRED EMBODIMENTS

Figure 1:
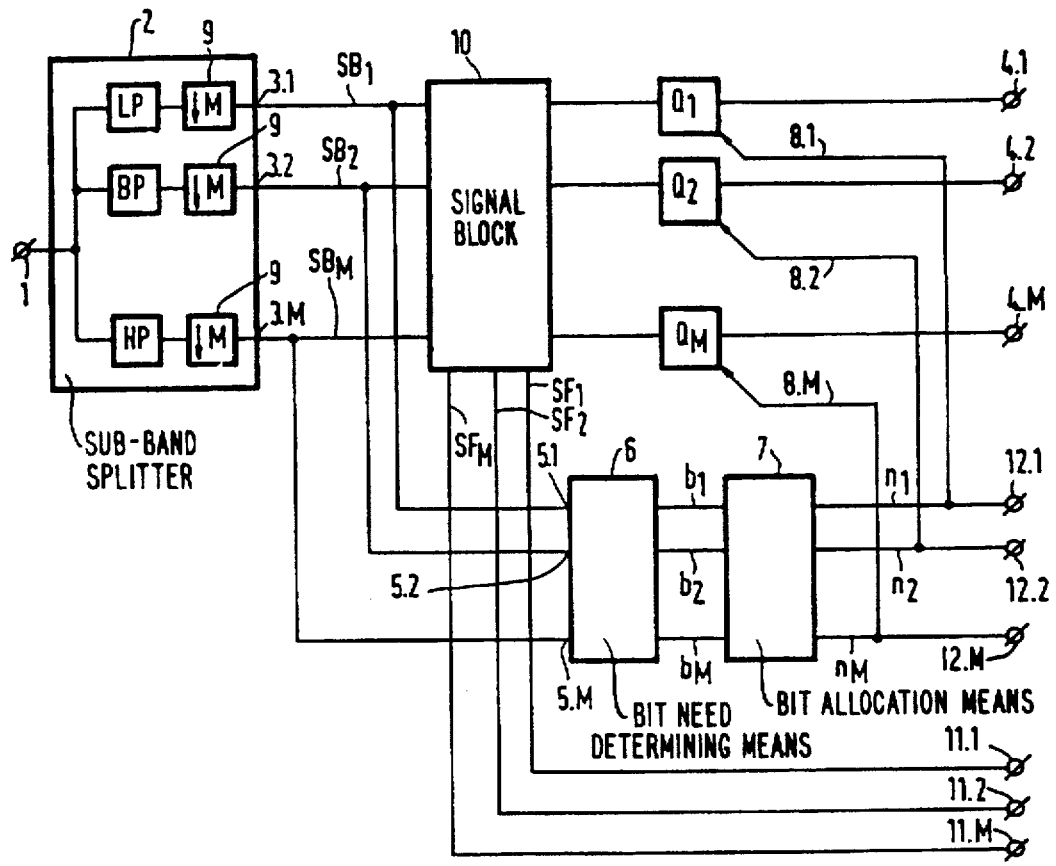
FIG. 1 shows an embodiment of the arrangement.

FIG. 1 shows an embodiment of the arrangement. An input terminal 1 of the arrangement is supplied with a wide-band digital signal. In this context one may think of an audio signal having a bandwidth of about 20 kHz. The audio signal may be a stereo audio signal. In that case only one of the two signal portions (the left or right signal portion) of the stereo audio signal will be further discussed. The other signal portion may then be subjected to the same process.

Input 1 is supplied with, for example, 16-bit samples of, for example, the left signal portion of the audio signal having a 48 kHz sample frequency. The audio signal is applied to a sub-band splitter 2. The sub-band splitter 2 distributes the audio signal over M sub-bands by means of M filters i.e. a low-pass filter LP, M-2 bandpass filters, BP and a high-pass filter HP. M is equal to, for example, 32. The sample frequency of the M sub-band signals is reduced in the blocks referenced 9. In such a block the sample frequency is reduced by a factor of M. The signals thus obtained are presented at the outputs 3.1, 3.2, . . . 3.M. At the output 3.1 the signal is presented in the lowest sub-band $SB_1$. At the output 3.2 the signal is presented in the lowest but one sub-band $SB_2$. At the output 3.M the signal is presented in the highest sub-band $SB_m$. The signals at the outputs 3.1 to 3.M have the form of successive samples expressed in 16-bit numbers or more, for example, 24-bit numbers. In the present exemplary embodiment the sub-bands $SB_1$ to $SB_M$ are all equally wide.

However, this is not necessary. In the prior-art publication (D3), Krasner, proposes a subdivision into a plurality of sub-bands whose bandwidths approximately correspond to the bandwidths of the critical bands of the human auditory system in the respective frequency areas.

The operation of the sub-band splitter 2 will not be explained any further because the operation of the sub-band splitter has already been extensively discussed. For this purpose, the reader be referred to the prior-art documents (D4) and (D5) which are assumed to be included in this application where necessary.

In a signal block 10, each time q samples in a subband signal, which form a signal block of consecutive signal blocks in said subband signal, are first normalized. This normalization is effected by dividing the amplitudes of the q samples by a scale factor value $SF_m$ which is representative of the amplitude of the sample having the largest absolute value in the signal block. The amplitude of the sample having the largest amplitude in the signal block of the sub-band $SB_m$ produces the scale factor $SF_m$, see document (D6). Subsequently, time equivalent signal blocks of the q normalized samples, which normalized samples have amplitudes which are now situated in an amplitude range from −1 to +1, are applied to quantizers $Q_1$ to $Q_M$. From prior art documents is will be clear that q is equal to 12 for the well known DCC digital compact cassette system. For other applications, such as in broadcast applications, q is chosen to be equal to 36.

In a quantizer $Q_m$, the q samples of a signal block of the subband signal $SB_m$ are quantized to quantized samples having a number of bits $n_m$ smaller than 16.

In the prior-art document (D6) this quantization is extensively discussed, cf. FIGS. 24, 25 and 26 and the relevant description in that document.

The quantized samples in the sub-bands $SB_1$ to $SB_M$ are then presented at the respective outputs 4.1 to 4.M.

The outputs 3.1 to 3.M are furthermore coupled to the respective inputs 5.1 to 5.M of bit need determining means 6. The bit need determining means 6 determines for time-equivalent $q_1$-sample signal blocks of the left sub-band signal portion in the sub-bands $SB_1$ to $SB_M$ the bit need $b_m$.

The bit need $b_m$ is a relative number which bears a relationship to the number of bits with which the q samples in a q-sample signal block in a sub-band signal should be quantized.

The bit needs $b_1$ to $b_M$ derived by the bit need determining means 6, are applied to bit allocation means 7. The bit allocation means 7 determines the actual number of bits $n_1$ to $n_M$ with which the q samples of the corresponding signal blocks in the sub-band signals $SB_1$ to $SB_M$ are to be quantized on the basis of the bit needs $b_1$ to $b_M$. Control signals corresponding to the numbers $n_1$, to $n_M$ are applied to the respective quantizers $Q_1$, to $Q_M$ over the lines 8.1 to 8.M, so that the quantizers are capable of quantizing the samples with the correct number of bits.

Documents (D1) and (D2) of the list of references extensively discuss the operation of the bit need determining means 6 and the bit allocation means 7 of the prior art arrangement.

The quantized samples in the signal blocks of the sub-band signals are thereafter applied to terminals 4.1 to 4.M. The bit allocation information formed from the numbers $n_1$, to $n_M$ is applied to terminals 12.1 to 12.M. Also the scale factor information formed from the scale factors $SF_1$ to $SF_M$ is applied to terminals 11.1 to 11.M. The signal components present at the terminals 4.1 to 4.M, 11.1 to 11.M and 12.1 to 12.M are further processed so as to enable transmission of the said signal components. Reference is made in this respect to document D6.

As has been said previously, the signal blocks of $q_1$ samples applied to the bitneed determining means 6 may be the same as the signal blocks of q samples on which quantization is carried out. In that case, this results in q being equal to $q_1$. It may however also be possible to take $q_1$ larger than q. In that situation, the signal block of q samples to be used for quantization in the quantizing means $Q_m$ forms a part of the signal block of $q_1$ samples to be used in the bitneed determining means 6. More specifically, the signal block of q samples may be the last q samples in the signal block of $q_1$ samples. In this situation, subsequent signal blocks of $q_1$ samples in a subband signal will thus overlap in time.

Figure 2:
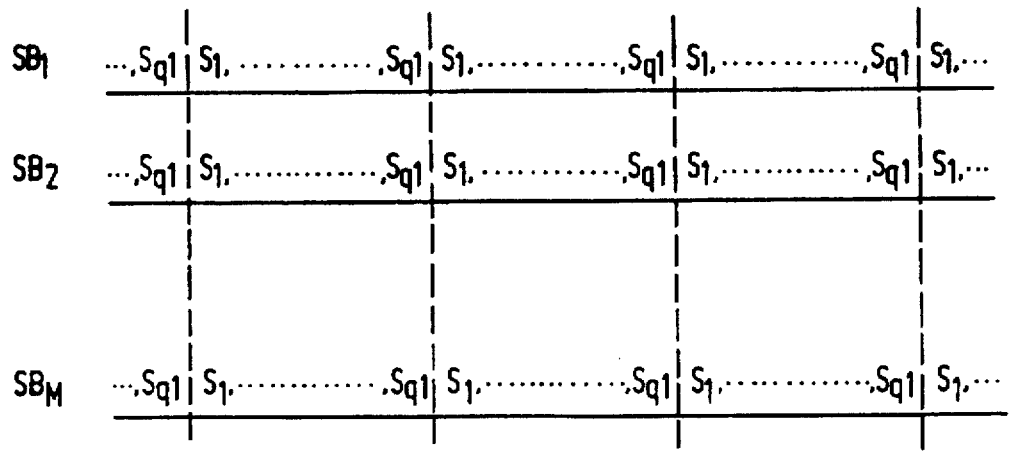
FIG. 2 shows the subband signals generated by the subband splitter of the arrangement of FIG. 1.

FIG. 2 schematically shows the subband signals $SB_1$ to $SB_M$, as they are generated by the subband splitter 2 and supplied to the outputs 3.1 to 3.M respectively. The subband signals are divided into subsequent signal blocks of $q_1$ samples $s_1$ to $s_{q1}$ each. Processing in the bitneed determining means 6 is each time carried out on time equivalent signal blocks of $q_1$ samples. That are those signal blocks included between the vertical broken lines in FIG. 2. In this situation, it is assumed that $q_1$ equals q.

Figure 3A:
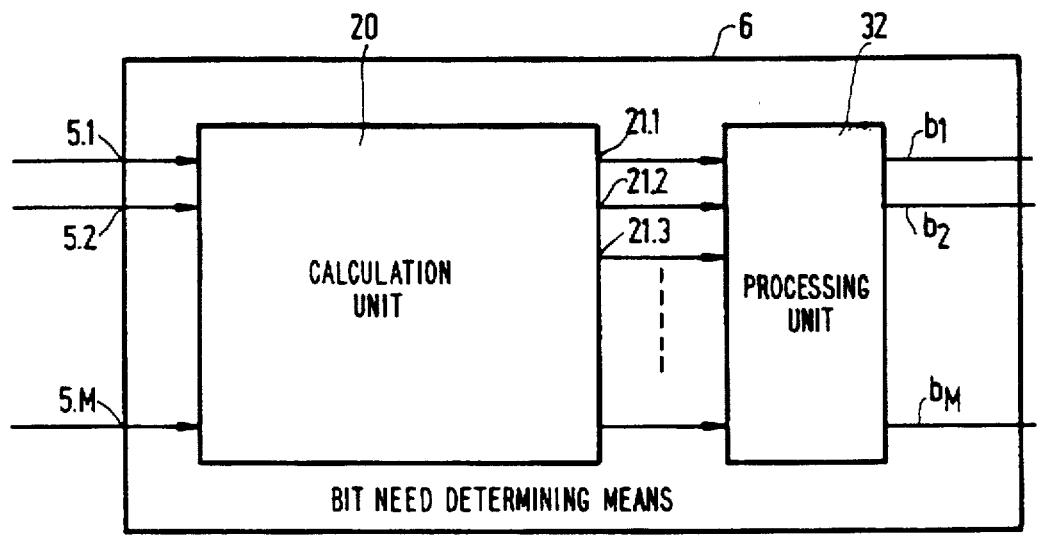
FIG. 3a an embodiment of the bitneed determining means of the arrangement of FIG. 1.

FIG. 3a shows a more detailed description of the arrangement in accordance with the invention, which is included in the block 6 of FIG. 1. In accordance with the invention, the block 6 comprises a calculation unit 20 for each time determining from the M subband signals, information which is representative of the signal spectrum of the wideband digital audio signal applied to the terminal 1. The calculation unit 20 has M inputs coupled to the M inputs 5.1 to 5.M of the block 6 so as to receive the M subband signals. The information representative of the signal spectrum of the wideband digital audio signal is available at a number of outputs indicated 21.1, 21.2, 21.3, . . . and so on. Those outputs are coupled to corresponding inputs of a further processing unit 32. The information available at the outputs of the unit 20 can be in the form of the M values $v_1$ to $v_M$. $v_m$ being the signal power or energy of the signal portion or signal block of the subband signal $SB_m$ in subband m. The powers $v_m$ thus obtained are supplied to the further processing unit 32, which carries out a matrix manipulation, as described in the documents (D1) and (D2) so as to obtain the bitneeds $b_1$, to $b_M$.

It may however also be possible to have more power values than the M power values given above. It will be clear that, in that case, another manipulation on the power values should be carried out in the further processing unit 32 to obtain the M values for the bitneeds $b_m$.

The calculation unit 20 is adapted to carry out a discrete Fourier transform based signal processing on each of the subband signals.

In one embodiment, the said Fourier transform based signal processing is equivalent to carrying out on each of the subband signals, more specifically each of the corresponding time equivalent signal blocks of the subband signals, a discrete Fourier transform (DFT) so as to obtain a set of Fourier transform coefficients for each one of said subband signals, deriving information representative of the signal spectrum in a subband and combining the sets of information so as to obtain the information representative of the signal spectrum of the wideband digital audio signal. The information representative of the signal spectrum in a subband can be in the form of a set of power values for corresponding frequencies in said subband. Next, the said M sets of power values are combined so as to obtain a combined set of power values representing the signal spectrum of the wideband digital audio signal.

In a second embodiment, which will be further explained, the Fourier transform based signal processing is equivalent to n times carrying out a discrete Fourier transform, such as a fast Fourier transform, on each of the time equivalent signal blocks of the subband signals. For subsequent Fourier transforms carried out in the same signal block, it can be said that those signal portions in a signal block of a subband signal on which two subsequent Fourier transforms are carried out, may in time partly overlap. Each Fourier transform carried out on a signal block results in a set of Fourier coefficients from which a set of power values representing the signal spectrum in the subband can be derived. As a result, n sets of such power values are obtained for each subband. Those n sets of power values are combined so as to obtain one combined set of power values for each subband. Next, the M sets of combined set of power values are combined so as to obtain a set of power values representing the signal spectrum of the wideband digital audio signal.

Stating that the Fourier transform based signal processing is 'equivalent to' carrying out a Fourier transform on a signal portion so as to obtain Fourier transform coefficients and deriving therefrom power values, means that the signal processing need not actually carry out said subsequent steps of carrying out a Fourier transform, obtaining the Fourier transform coefficients and deriving therefrom the power values. The actual signal processing carried out is 'based on' said steps. Otherwise said, the signal processing carried out is based on a calculation in which all those steps are subsequently carried out, but where the signal processing only includes the resulting calculation, so that the separate steps on which the calculation is based is not visible anymore in the signal processing carried out. This will be explained by further working out the second embodiment.

Figure 3B:
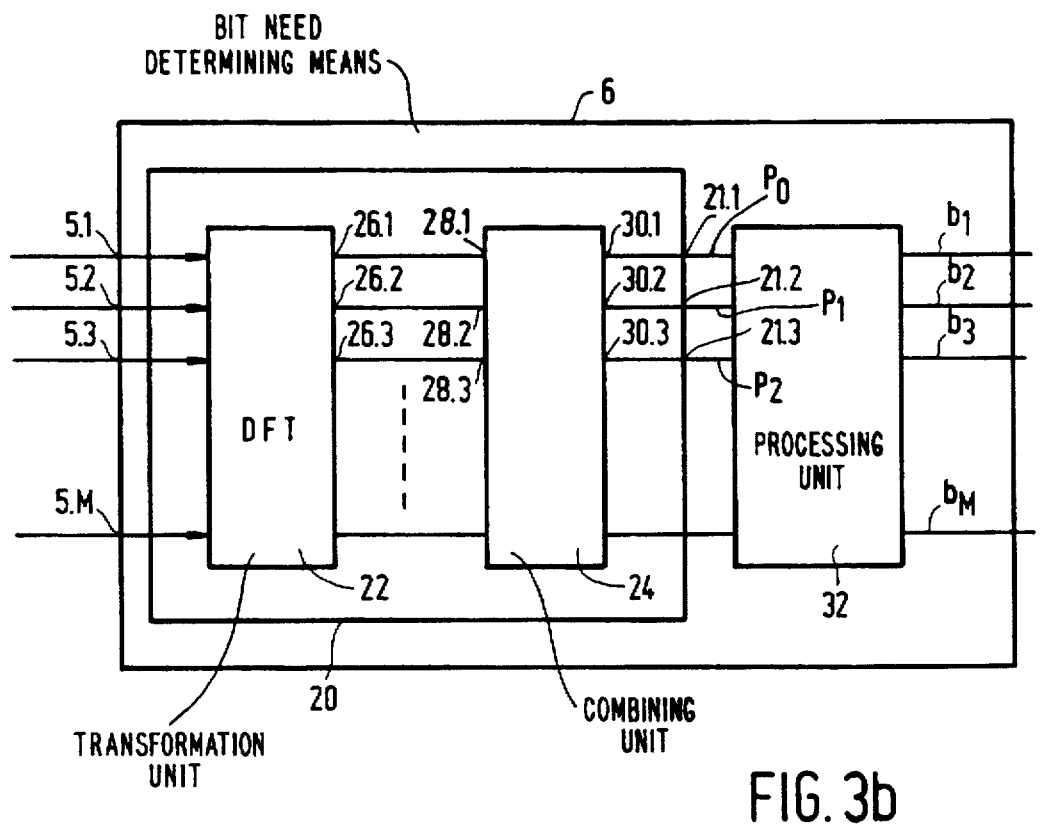
FIG. 3b a further elaborated version of the bitneed determining means.

This second embodiment can be realized by the circuit block diagram of FIG. 3b, which shows the calculation unit 20 comprising a transformation unit 22, which generates the M sets of power values (one set for each subband) at outputs 26.1, 26.2, 26.3, . . . and so on. Those M sets of power values are supplied to a combining unit 24, to combine the M sets of power values so as to obtain one combined set of power values representing the signal spectrum of the wideband digital audio signal.

In said second embodiment, the signal processing carried out in the transformation unit 22 is equivalent to carrying out $n(=3)$ times a DFT on the $q(=12)$ samples of a signal block. More specifically, a Fourier transform is carried out using only four of the 12 samples. Now, the Fourier transform coefficients Y(k) can be obtained as follows:

$$Yp[k] = \sum_{i=0}^{3} x[i] \cdot \exp(-2j \cdot \pi \cdot k \cdot i/4)$$

or:

$Y[0] = x[0] + x[1] + x[2] + x[3]$
$Y[1] = x[0] - j \cdot x[1] - x[2] + j \cdot x[3]$
$Y[2] = x[0] - x[1] + x[2] - x[3]$
$Y[3] = x[0] + j \cdot x[1] - x[2] - j \cdot x[3]$ The samples x[0] to x[3] are in the first one of the three fourier transforms carried out on a signal block equal to the samples $s_1$ to $s_4$ respectively. The samples x[0] to x[3] are in the second one of the three fourier transforms carried out on a signal block equal to the samples $s_5$ to $s_8$ respectively. The samples x[0] to x[3] are in the third one of the three fourier transforms carried out on a signal block equal to the samples $s_9$ to $s_{12}$ respectively.

In matrixform the fourier transform can be written as:

$$\begin{bmatrix} 1 & 1 & 1 & 1 \\ 1 & -j & -1 & j \\ 1 & -1 & 1 & -1 \\ 1 & j & -1 & -j \end{bmatrix} \cdot \begin{bmatrix} x[0] \\ x[1] \\ x[2] \\ x[3] \end{bmatrix} = \begin{bmatrix} Y[0] \\ Y[1] \\ Y[2] \\ Y[3] \end{bmatrix}$$

The four Fourier transform coefficients Y[0] to Y[3] result in three frequency components in the subband of interest, namely Y[0] for a frequency f=0, which is the frequency component representing the lower boundary frequency of the subband, Y[2] for a frequency $f=f_s/2$, which is the frequency component representing the upper boundary of the subband, and Y[1] and Y[3] for a frequency $f=f_s/4$, which is the frequency exactly halfway the subband. This is shown schematically in FIG. 4.

The power P(0,m) at frequency f=0 for a subband with sequence number m, is equal to Y[0] squared, or $P(0,m)=|Y[0]|^2=(x[0]+x[1]+x[2]+x[3])^2$.

The power P(1,m) at frequency $f=f_s/4$ for the subband with sequence number m, is equal to the sum of Y[1] multiplied by its complex conjugate value and Y[3] multiplied by its complex conjugate value, or $P(1,m)=|Y[1]|^2+|Y[3]|^2=2\{(x[0]-x[2])^2+(x[1]-x[3])^2\}$.

The power P(2,m) at frequency $f=f_s/2$ for the subband with sequence number m, is equal to Y[2] squared, or $P(2,m)=|Y[2]|^2=(x[0]-x[1]+x[2]-x[3])^2$.

Thus, instead of carrying out a Fourier transform, obtaining the Fourier coefficients first and subsequently calculating the power, the computation explained above is carried out three times for each subband, namely on the first four samples of a signal block, the second four samples in the said signal block and on the third four samples in the signal block. As a result three sets of powers P(0,m), P(1,m) and P(2,m) are obtained. The three values P(0,m) are added so as to obtain the power P(0,m) used for the further processing. The three values P(1,m) are added so as to obtain the power P(1,m) used for the further processing. The three values P(2,m) are added so as to obtain the power P(2,m) used for the further processing. Another combination could be to realize some weighting on the three values for each of the P(0,m), P(1,m) and P(2,m). The three power values thus obtained for each subband are supplied to the outputs 26.1, 26.2, 26.3, . . . and so on of the transformation unit 22.

Figure 4:
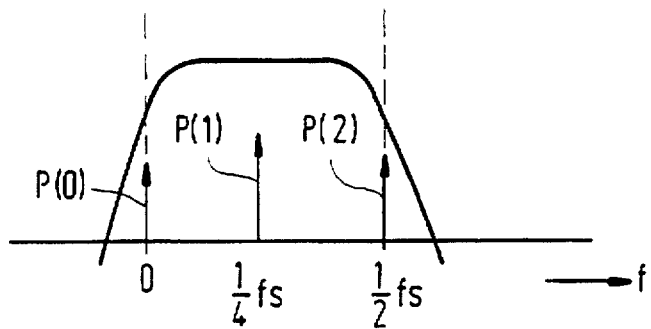
FIG. 4 shows the power values in a subband.

If the subband of FIG. 4 is the lowest subband, that is the subband with sequence number m=1, the value $f_s/2$ equals 750 Hz. This for the reason that the wideband digital audio signal can have a frequency of 24 kHz, which results in a sampling frequency of 48 kHz, in accordance with the Nyquist sampling theorem. As M is 32, this results in 750 Hz (24000/32) wide subbands. P(0,1) for this subband thus relates to the actual power of the wideband digital audio signal at a frequency of 0 Hz, P(1,1) for this subband thus relates to the actual power of the wideband digital audio signal at a frequency of 375 (=750/2) Hz and P(2,1) for this subband thus relates to the actual power of the wideband digital audio signal at a frequency of 750 Hz.

If the subband of FIG. 2 is the next higher (second) subband (m=2), the frequency value $f_s/4$ relates to the central frequency of the subband from 750 to 1500 Hz, that is 1125 Hz. As a result of the specific way of signal splitting in the splitter unit 2, including the downsampling in the downsamplers 9, the subband from 750 Hz and 1500 Hz not only has been mixed down to the frequency band between 0 Hz and 750 Hz, but has also been mirrored around the central frequency of the subband. Consequently, the power P(0,2) obtained as given above, now has a relation to the power of the wideband digital audio signal at a frequency of 1500 Hz, the power P(1,2) relates to the actual power of the wideband digital audio signal at a frequency of 1125 Hz, and the power P(2,2) now has a relation to the power of the wideband digital audio signal at f=750 Hz.

It should thus be noted that, if signal splitting is carried out in a different way, it may result in no mirroring of the spectrum.

If the subband of FIG. 4 is the third subband (m=3), this subband runs from 1500 Hz to 2250 Hz. P(0,3) for this subband thus relates to the actual power of the wideband digital audio signal at a frequency of 1500 Hz, P(1,3) for this subband thus relates to the actual power of the wideband digital audio signal at a frequency of 1875 Hz and P(2,3) for this subband thus relates to the actual power of the wideband digital audio signal at a frequency of 2250 Hz.

If the subband of FIG. 4 is the fourth subband (m=4), this subband runs from 2250 Hz to 3000 Hz. What has been said for the second subband, also is valid for the fourth and all other even numbered subbands, namely that the mixing down also results in a mirroring around the central frequency value in the subband. P(0,4) for this subband thus relates to the actual power of the wideband digital audio signal at a frequency of 3000 Hz, P(1,4) for this subband thus relates to the actual power of the wideband digital audio signal at a frequency of 2250 Hz and P(2,4) for this subband thus relates to the actual power of the wideband digital audio signal at a frequency of 2625 Hz.

This description can be continued for subsequent subbands.

Figure 5:
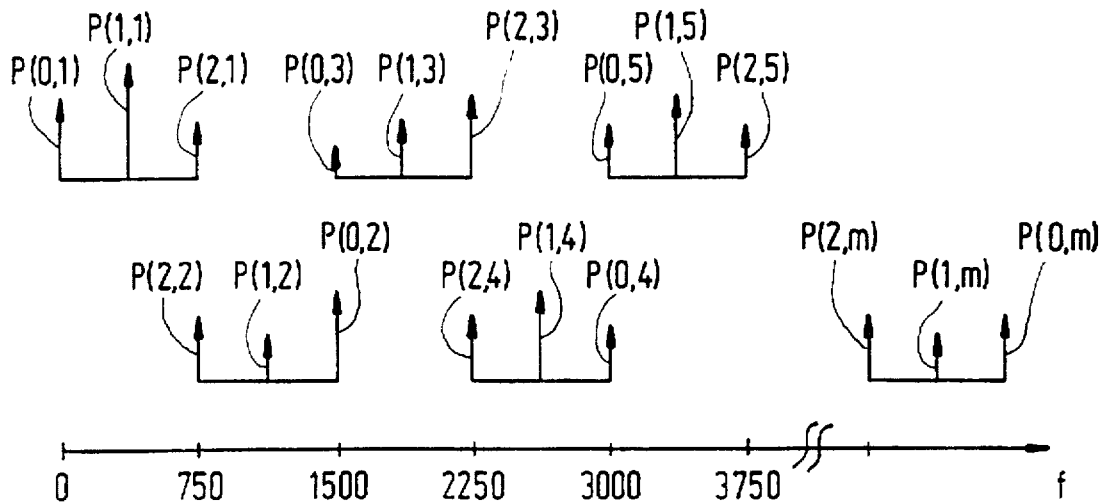
FIG. 5 shows the signal spectra for the various subband signals.

FIG. 5 shows the results for the various subbands, as a function of frequency, present at the outputs of the transformation unit 22. The top line of power spectra are the power spectra for the subbands with odd sequence numbers, running from 1 and up, and the lower line of power spectra are the power spectra for the subbands with the even sequence numbers.

Having obtained the powers of FIG. 5, the signal combining unit 24 derives the spectrum of the wideband digital audio signal from the powers of FIG. 5 by adding the powers for the same frequency value, for those frequencies where there are two power values available. That is: for all the multiples of 750 Hz. Moreover, in order to obtain the correct value for the power at f=0 Hz, the value P(0,1) should be multiplied by 2.

As a result 65 (32×2+1) power values $p_j$ are present at the outputs 30.1, 30.2, 30.3, . . . and so on, for the total frequency range between 0 Hz and 24 kHz, where j runs from 1 to 65. Those 65 values for the power can be used in the block 32 to obtain the bitneeds $b_1$ to $b_M$ directly therefrom.

Figure 6:
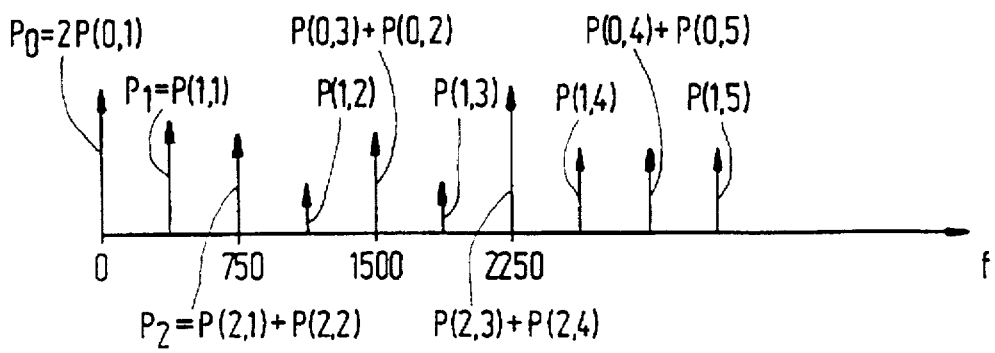
FIG. 6 shows the signal spectrum obtained.

Another way of obtaining the bitneeds is as follows. From document (D2) it is known that only 32 values for $v_m$, as power values for the subsequent matrix manipulation are needed so as to obtain the bitneeds $b_1$ to $b_M$. Consequently, in order to use the well known matrix manipulation as a way to obtain the bitneeds $b_1$ to $b_M$, it will be necessary to convert the 65 power values $P_j$ of FIG. 6 into only 32 power values that can be used as the values $v_m$ in the well known bitneed calculation method described in (D2).

Again another solution could be to use a 65×65 matrix so as to obtain 65 bitneeds from the 65 power values and to take either the largest or the smallest bitneed of the bitneeds present in a subband, as the bitneed for that subband in the bitallocation step.

Figure 7:
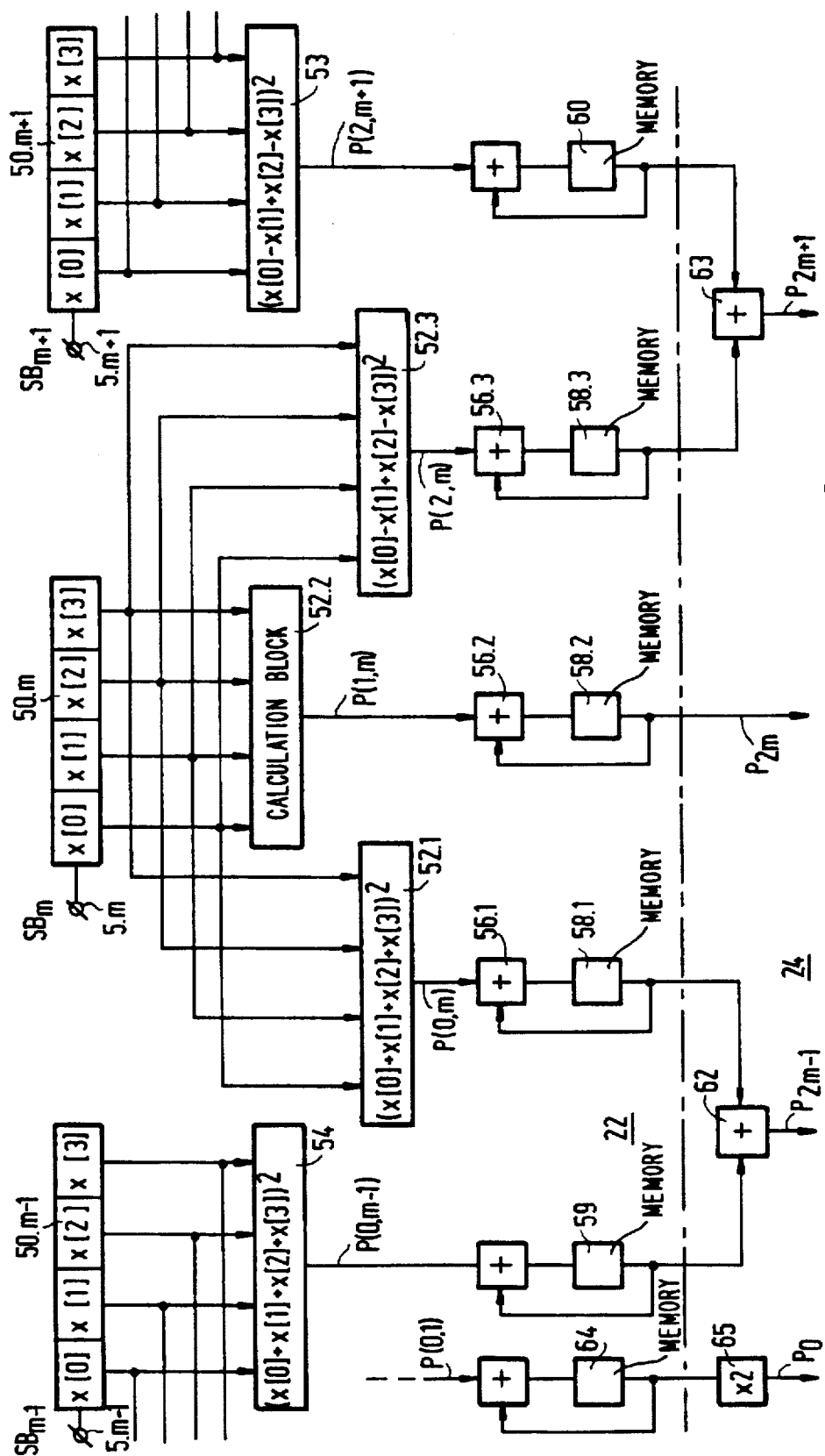
FIG. 7 shows an embodiment of the calculation unit for carrying out the fourier transform based signal processing.

FIG. 7 shows schematically an embodiment of the calculation unit 20 for carrying out the signal processing described above. The calculation unit 20 comprises the transformation unit 22 and the signal combining unit 24 of FIG. 3b. The transformation unit 22 comprises memories 50.1 to 50.q, of which only the memories 50.m−1, 50.m and 50.m+1 are shown. The memories have four storage locations for storing four subsequent sample values indicated x[0] to x[3].

The memories 50.1 to 50.M have inputs coupled to the inputs 5.1 to 5.M of the bit determining unit 6 for receiving the subband signals. Only the inputs 5.m−1, 5.m and m+1 are shown in FIG. 7.

The memory 50.m−1 stores each time four sample values of the subband signal $SB_{m-1}$. As has been said previously, those four sample values can be the sample values $s_1$ to $s_4$, or the sample values $s_5$ to $s_8$ or the sample values $S_9$ to $s_{12}$ of a signal block of the subband signal $SB_{m-1}$. The memory 50.m stores each time four sample values of the subband signal $SB_m$. The four sample values stored in the memory 50.m are time equivalent to the samples stored in the memory 50.m−1. The memory 50.m+1 stores each time four sample values of the subband signal $SB_{m+1}$. The four sample values stored in the memory 50.m+1 are time equivalent to the four samples stored in the memories 50.m−1 and 50.m.

Four outputs of the memory 50.m, one output for each of the storage locations in the memory 50.m, are coupled to corresponding inputs of three calculation blocks 52.1, 52.2 and 52.3. The calculation block 52.1 is adapted to calculate the power P(0,m) from the four sample values x[0] to x[3] in accordance with the equation given above. The calculation block 52.2 is adapted to calculate the power P(1,m) from the four sample values x[0] to x[3] in accordance with the equation given above. The calculation block 52.3 is adapted to calculate the power P(2,m) from the four sample values x[0] to x[3] in accordance with the equation given above.

Identical calculation blocks are present for each of the other memories 50.1 to 50.m−1 and 50.m+1 to 50.M. FIG. 7 shows the calculation block 53 for calculating the power P(2,m+1) from the sample values x[0] to x[3] stored in the memory 50.m+1, and the calculation block 54 for calculating the power P(0,m−1) from the sample values x[0] to x[3] stored in the memory 50.m−1.

The outputs of all calculation blocks are coupled to a first input of an adder unit, such as the adder units 56.1, 56.2 and 56.3. An output of the adder units is coupled to an input of a memory, such as the memories 58.1, 58.2 and 58.3. Outputs of the memories are coupled to a second input of the adder units.

The outputs of the memories 59 and 58.1 are further coupled to corresponding inputs of an adder unit 62 and the outputs of the memories 58.3 and 60 are coupled to corresponding inputs of an adder unit 63.

The signal processing on time equivalent signal blocks is as follows. The memories 58.1, 58.2, 58.3, 59 and 60 are cleared so that their contents is zero. The first four sample values $s_1$ to $s_4$ of all the time equivalent signal blocks of the M subband signals are stored in the memories 50.1 to 50.M. For each four samples of a subband signal, such as subband signal $SB_m$, the three power values P(0,m), P(1,m) and P(2,m) are calculated in the calculation blocks 52.1, 52.2 and 52.3. Those three power values supplied to the adders 56.1, 56.2 and 56.3. As the contents of the memories 58.1, 58.2 and 58.3 are zero, a zero value is supplied to the second inputs of the adders. Consequently, the power values are stored in the memories 58.1, 58.2 and 58.3 as they are.

Next the second set of four sample values $s_5$ to $s_8$ of all the time equivalent signal blocks are stored in the memories 50.1 to 50.M. Again, the three power values P(0,m), P(1,m) and P(2,m) for a subband signal $SB_m$ are calculated and supplied to the respective adders 56.1, 56.2 and 56.3. The power values now calculated are added to the power values stored in the memories 58.1, 58.2 and 58.3 and the added values are again stored in the said memories.

Next the third set of four sample values $s_9$ to $s_{12}$ of all the time equivalent signal blocks are stored in the memories 50.1 to 50.M. Again, the three power values P(0,m), P(1,m) and P(2,m) for a subband signal $SB_M$ are calculated and supplied to the respective adders 56.1, 56.2 and 56.3. The power values now calculated are added to the power values stored in the memories 58.1, 58.2 and 58.3 and the added values are again stored in the said memories.

The power value now stored in the memory 58.2 is the power value $P_{2m}$, see above. Further, the power values P(0,m−1) and P(0,m) stored in the memories 59 and 58.1 respectively are added together in the adder unit 62 so as to obtain the power value $P_{2m-1}$, see also above. In the same way, the power values P(2,m) and P(2,m+1) stored in the memories 58.3 and 60 respectively are added together in the adder unit 63 so as to obtain the power value $P_{2m+1}$, see also above.

The signal combination unit 24 thus comprises a number of adder units, such as the adder units 62 and 63 shown in FIG. 7, for adding each time the power value for the lowest frequency in a subband with the power value for the highest frequency in the next lower subband.

It will be clear from the foregoing description that, in order to obtain the lowest power component $P_0$, an additional multiplier 65, see FIG. 7, is needed. The multiplier 65 has its input coupled to the output of the memory 64, in which the power value P(0,1) is stored. The multiplier 65 multiplies P(0,1) by 2 so as to obtain $P_0$.

Further, preferably, a windowing, such as a Hamming windowing, is carried out on the signals prior to carrying out the time-to-frequency transform based processing. Also, an aliasing compensation well known in the art is preferably carried out in the case when $p_1$ is larger than 4.

REFERENCES

List of related documents to be printed on the front page of the patent document (D1) EP-A 457.390 (PHN 13.328)
(D2) EP-A 457.391 (PHN 13.329)
(D3) IEEE ICASSP 80, Vol. 1, 327–331, Apr. 9–11, 1980 M. A. Krasner "The critical band coder . . . Digital encoding of speech signals based on perceptual requirements of the auditory system".
(D4) EP-A 289.080 (PHN 12.108)
(D5) EP-A 400.755 (PHQ 89.018A)
(D6) EP-A 402.973 (PHN 13.241)
(D7) 'The ISO/MPEG-audio codec: a generic standard for coding of high-quality digital audio', by K. Brandenburg et al, preprint no. 3336 of the 92nd AES Convention in Vienna, March 1992

We claim:

1. An arrangement for determining a signal spectrum of a wideband digital audio signal and for deriving bit allocation information in response thereto, in an adaptive bitallocation system, the arrangement comprising an input terminal for receiving the wideband digital audio signal, signal splitting means for splitting the wideband digital audio signal into M narrow band sub signals, each one of the M sub signals being representative of a component of the wideband digital audio signal which is present in a corresponding one of M adjacent substantially non-overlapping narrow bands in the frequency band of the wideband digital audio signal, calculating means for each time determining from the M sub signals, information which is representative of the signal spectrum of the wideband digital audio signal, bit allocation information determining means for deriving bit allocation information in response to the information which is representative of the signal spectrum of the wide band digital audio signal, the bit allocation information being representative of the number of bits with which samples of the sub signals will be represented, and where M is an integer larger than one, characterized in that, the calculating means comprises transformation means for carrying out separately on each of the sub signals a time-to-frequency transform based signal processing so as to obtain said information representative of the signal spectrum of the wideband digital audio signal.

2. Arrangement as claimed in claim 1, the calculating means being adapted to determine each time from M time equivalent signal blocks, one block in each of the M sub signals, each signal block comprising $q_1$ samples of a sub signal, said information which is representative of the signal spectrum of the wideband digital audio signal, where $q_1$ is an integer larger than one, characterized in that, the transformation means being further adapted to carry out on each of the time equivalent signal blocks said time-to-frequency transform based signal processing so as to obtain said information representative of the signal spectrum of the wideband digital audio signal.

3. Arrangement as claimed in claim 2, characterized in that the transformation means are adapted to carry out a time-to-frequency transform based signal processing which is equivalent to carrying out a time-to-frequency transform on each signal block so as to obtain transform coefficients for each signal block of a subband signal in a subband, deriving therefrom information representative of the signal spectrum in said subband, and combining the information representative of the signal spectra in the M subbands so as to obtain said information representative of the signal spectrum of the wideband digital audio signal.

4. Arrangement as claimed in claim 2, characterized in that, the transformation means are adapted to carry out a time-to-frequency transform based signal processing which is equivalent to carrying out, on each signal block, n times a time-to-frequency transform on samples of a signal block so as to obtain n sets of transform coefficients for a signal block in a subband, deriving therefrom information representative of the signal spectrum in said subband, and combining the information representative of the signal spectra in the M subbands so as to obtain said information representative of the signal spectrum of the wideband digital audio signal.

5. Arrangement as claimed in claim 3, characterized in that said information which is representative of the signal spectrum in a subband is in the form of a number of power values for a corresponding number of frequencies in said subband, the transformation means further being adapted to combine the M sets of power values, one set for each subband, so as to obtain a combined set of power values representing the signal spectrum of the wideband digital audio signal.

6. Arrangement for determining a signal spectrum of a wideband digital audio signal and for deriving bit allocation information in response thereto, in an adaptive bitallocation system, the arrangement comprising an input terminal for receiving the wideband digital audio signal, signal splitting means for splitting the wideband digital audio signal into M narrow band sub signals, each one of the M sub signals being representative of a component of the wideband digital audio signal which is present in a corresponding one of M adjacent substantially non-overlapping narrow bands in the frequency band of the wideband digital audio signal, calculating means for each time determining from the M sub signals, information which is representative of the signal spectrum of the wideband digital audio signal, bit allocation information determining means for deriving bit allocation information in response to the information which is representative of the signal spectrum of the wide band digital audio signal, the bit allocation information being representative of the number of bits with which samples of the sub signals will be represented, and where M is an integer larger than one, characterized in that, the calculating means comprises transformation means for carrying out on each of the sub signals a time-to-frequency transform based signal processing so as to obtain said information representative of the signal spectrum of the wideband digital audio signal, the calculating means being adapted to determine each time from M time equivalent signal blocks, one block in each of the M sub signals, each signal block comprising $q_1$ samples of a sub signal, said information which is representative of the signal spectrum of the wideband digital audio signal, where $q_1$ is an integer larger than one, the transformation means being further adapted to carry out on each of the time equivalent signal blocks said time-to-frequency transform based signal processing so as to obtain said information representative of the signal spectrum of the wideband digital audio signal, the transformation means being adapted to carry out a time-to-frequency transform based signal processing which is equivalent to carrying out, on each signal block, n times a time-to-frequency transform on samples of a signal block so as to obtain n sets of transform coefficients for a signal block in a subband, deriving therefrom information representative of the signal spectrum in said subband, and combining the information representative of the signal spectra in the M subbands so as to obtain said information representative of the signal spectrum of the wideband digital audio signal, the transformation means being adapted to carry out a time-to-frequency transform based signal processing which is equivalent to carrying out, on each signal block in a subband, n times a time-to-frequency transform on $p_1$ samples in a signal block so as to obtain n sets of transform coefficients, deriving from the n sets of transform coefficients a number of $p_2$ power values for a corresponding number of $p_2$ frequencies in said subband, the transformation means being further adapted to combine the M sets of $p_2$ power values, so as to obtain a combined set of $p_3$ power values representing the signal spectrum of the wideband digital audio signal, where n, $p_1$, $p_2$ and $p_3$ are integers larger than 1, and $p_1$ is smaller than $q_1$.

7. Arrangement as claimed in claim 6, characterized in that $n=q_1/p_1$.

8. Arrangement as claimed in claim 6, characterized in that, the transformation means are further adapted to combine the power value of the set of power values corresponding to the highest frequency component in a subband with the power value of the set of power values corresponding to the lowest frequency component in the next higher subband.

9. Arrangement as claimed in claim 8, as far as dependent of claim 6, characterized in that $p_3=M(P_2-1)+1$.

10. Arrangement as claimed in claim 6, characterized in that $q_1=12$ and $P_1=4$.

11. Arrangement as claimed in claim 1, characterized in that time-to-frequency transform is a discrete Fourier transform.

12. Arrangement for determining a signal spectrum of a wideband digital audio signal and for deriving bit allocation information in response thereto, in an adaptive bitallocation system, the arrangement comprising an input terminal for receiving the wideband digital audio signal, signal splitting means for splitting the wideband digital audio signal into M narrow band sub signals, each one of the M sub signals being representative of a component of the wideband digital audio signal which is present in a corresponding one of M adjacent substantially non-overlapping narrow bands in the frequency band of the wideband digital audio signal, calculating means for each time determining from the M sub signals, information which is representative of the signal spectrum of the wideband digital audio signal, bit allocation information determining means for deriving bit allocation information in response to the information which is representative of the signal spectrum of the wide band digital audio signal, the bit allocation information being representative of the number of bits with which samples of the sub signals will be represented, and where M is an integer larger than one, characterized in that, the calculating means comprises transformation means for carrying out on each of the sub signals a time-to-frequency transform based signal processing so as to obtain said information representative of the signal spectrum of the wideband digital audio signal, the calculating means being adapted to determine each time from M time equivalent signal blocks, one block in each of the M sub signals, each signal block comprising $q_1$ samples of a sub signal, said information which is representative of the signal spectrum of the wideband digital audio signal, where $q_1$ is an integer larger than one, the transformation means being further adapted to carry out on each of the time equivalent signal blocks said time-to-frequency transform based signal processing so as to obtain said information representative of the signal spectrum of the wideband digital audio signal, the transformation means being adapted to carry out a time-to-frequency transform based signal processing which is equivalent to carrying out a time-to-frequency transform on each signal block so as to obtain transform coefficients for each signal block of a subband signal in a subband, deriving therefrom information representative of the signal spectrum in said subband, and combining the information representative of the signal spectra in the M subbands so as to obtain said information representative of the signal spectrum of the wideband digital audio signal, the transformation means being further adapted to combine the power value of the set of power values corresponding to the highest frequency component in a subband with the power value of the set of power values corresponding to the lowest frequency component in the next higher subband.

* * * * *